US006981132B2

(12) United States Patent
Christie et al.

(10) Patent No.: US 6,981,132 B2
(45) Date of Patent: Dec. 27, 2005

(54) UNIFORM REGISTER ADDRESSING USING PREFIX BYTE

(75) Inventors: David S. Christie, Austin, TX (US); Kevin J. McGrath, Los Gatos, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 646 days.

(21) Appl. No.: 09/825,183

(22) Filed: Apr. 2, 2001

(65) Prior Publication Data

US 2004/0186981 A1 Sep. 23, 2004

Related U.S. Application Data

(60) Provisional application No. 60/224,368, filed on Aug. 9, 2000.

(51) Int. Cl.[7] .............................................. G06F 9/30
(52) U.S. Cl. ..................................... 712/226; 712/208
(58) Field of Search ................................. 712/208, 209, 712/226

(56) References Cited

U.S. PATENT DOCUMENTS

| | | |
|---|---|---|
| 4,044,338 A | 8/1977 | Wolf |
| 4,050,094 A | 9/1977 | Bourke |
| 4,109,311 A | 8/1978 | Blum et al. |
| 4,385,352 A | 5/1983 | Bienvenu |
| 4,453,212 A | 6/1984 | Gaither et al. |
| 4,807,115 A | 2/1989 | Torng |
| 4,835,734 A | 5/1989 | Kodaira et al. |
| 4,858,105 A | 8/1989 | Kuriyama et al. |
| 4,926,322 A | 5/1990 | Stimac et al. |
| 4,928,223 A | 5/1990 | Dao et al. |
| 4,972,338 A | 11/1990 | Crawford et al. |
| 5,053,631 A | 10/1991 | Perlman et al. |
| 5,058,048 A | 10/1991 | Gupta et al. |
| 5,109,334 A | 4/1992 | Kamuro |
| 5,125,087 A | 6/1992 | Randell |
| 5,129,067 A | 7/1992 | Johnson |

(Continued)

FOREIGN PATENT DOCUMENTS

EP          067 667          12/1982

(Continued)

OTHER PUBLICATIONS

Intel, iAPX 86/88, 186/188 User's Manual, Hardware Reference, 1985, pp. 1-3 to 1-5 and 1-41 to 1-42.*

(Continued)

*Primary Examiner*—Eddie Chan
*Assistant Examiner*—Aimee Li
(74) *Attorney, Agent, or Firm*—Lawrence J. Merkel; Meyertons, Hood, Kivlin, Kowert & Goetzel, P.C.

(57) ABSTRACT

A processor changes the mapping of register addresses to registers dependent on an instruction field. In one particular embodiment, the mapping may be changed for byte addressing of the registers. A register mapping in which each register address maps to either the least significant byte or the next least significant byte of a subset of the registers may be supported, as well as a register mapping in which each register address maps to the least significant byte of each register, in one implementation. In one particular implementation, the instruction field may be a prefix field (e.g. a prefix byte). The processor may provide for uniform addressing of registers (e.g. byte addressing of the registers) responsive to a prefix field, in other embodiments, irrespective of the addressing provided if the prefix field is not included, or is encoded differently than the encoding which results in the uniform addressing.

20 Claims, 13 Drawing Sheets

U.S. PATENT DOCUMENTS

| | | | |
|---|---|---|---|
| 5,136,697 A | | 8/1992 | Johnson |
| 5,226,126 A | | 7/1993 | McFarland et al. |
| 5,226,130 A | | 7/1993 | Favor et al. |
| 5,226,132 A | | 7/1993 | Yamamoto et al. |
| 5,274,834 A | | 12/1993 | Kardach et al. |
| 5,293,592 A | | 3/1994 | Fu et al. |
| 5,303,358 A | * | 4/1994 | Baum .......................... 712/226 |
| 5,321,836 A | | 6/1994 | Crawford et al. |
| 5,375,213 A | | 12/1994 | Arai |
| 5,438,668 A | | 8/1995 | Coon et al. |
| 5,471,593 A | | 11/1995 | Branigin |
| 5,481,684 A | | 1/1996 | Richter et al. |
| 5,560,032 A | | 9/1996 | Nguyen et al. |
| 5,561,784 A | | 10/1996 | Chen et al. |
| 5,651,125 A | | 7/1997 | Witt et al. |
| 5,680,578 A | * | 10/1997 | Dutton et al. ............... 711/154 |
| 5,689,672 A | | 11/1997 | Witt et al. |
| 5,732,224 A | * | 3/1998 | Gulick et al. ............... 710/100 |
| 5,758,116 A | | 5/1998 | Lee et al. |
| 5,768,574 A | | 6/1998 | Dutton et al. |
| 5,809,273 A | | 9/1998 | Favor et al. |
| 5,822,778 A | * | 10/1998 | Dutton et al. ............... 711/208 |
| 5,838,984 A | | 11/1998 | Nguyen et al. |
| 5,848,284 A | | 12/1998 | Sharangpani |
| 5,903,919 A | * | 5/1999 | Myers .......................... 711/220 |
| 5,905,900 A | | 5/1999 | Combs et al. |
| 5,935,240 A | | 8/1999 | Mennemeier et al. |
| 6,014,735 A | * | 1/2000 | Chennupaty et al. ....... 712/210 |
| 6,014,739 A | | 1/2000 | Christie |
| 6,145,049 A | | 11/2000 | Wong |
| 6,157,996 A | | 12/2000 | Christie et al. |
| 6,496,923 B1 | * | 12/2002 | Gruner et al. ............... 712/213 |

FOREIGN PATENT DOCUMENTS

| | | |
|---|---|---|
| EP | 259 095 | 3/1988 |
| EP | 369 396 | 5/1990 |
| EP | 381 471 | 8/1990 |
| EP | 425 410 | 5/1991 |
| EP | 459 232 | 12/1991 |
| EP | 467 152 | 1/1992 |
| EP | 942 357 | 9/1999 |
| GB | 2263985 | 8/1993 |
| GB | 2263987 | 8/1993 |
| GB | 2281422 | 3/1995 |

OTHER PUBLICATIONS

James L. Turley, Advanced 80386 Programming Techniques, 1998, McGraw-Hill, pp. 19-20, 261-264.*

*The Technology Behind Crusoe™ Processors, Low-Power x86-Compatible Processors Implemented with Code Morphing™ Software*, Transmeta Corporation, Jan. 2000, pp. 1-18.

*Alpha Learns to Do Windows; Digital's FX!32 is The Key To Running Win32 Software on Alpha/Windows NT.*, Selinda Chiquoine, BYTE, Aug. 4, 1998, 4 pages.

*Awards Stack Up for DIGITAL FX!32 Windows Compatibility Software for Alpha*, DIGITAL Press Releases, Dec. 11, 1997, 7 pages.

*DIGITAL FX!32; White Paper: How DIGITAL FX!32 Works*, DIGITAL Semiconductor, Jan. 26, 1998, 4 pages.

*An Alpha in PC Clothing; Digital Equipment's New x86 Emulator Technology Makes An Alpha System a Fast x86 Clone*, Tom Thompson, BYTE, Aug. 4, 1998, 7 pages.

*AMD 64-Bit Technology; The AMD x86 Architecture Programmers Overview*, AMD, Publication #24108 Rev: A, Aug. 2000, pp. 1-106.

*AMD 64-Bit Technology; The AMD x86-64 Architecture Programmers Overview*, AMD, Pulication #24108 Rev: C, Jan. 2001, pp. 1-128.

*Intel486 DX Microprocessor*, Intel, 6 pages.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

"*Intel Architecture Software Developer's Manual, vol. 1: Basic Architecture*", Intel Corporation, Prospect IL, 1996, 1997, Chapter 8: Programming With The Intel MMX™ Technology, pp. 8-1 through 8-15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

Intel, "Pentium Processor Family User's Manual, vol. 1: Pentium Processor Family Data Book," 1994, 2-1 to 2-4.

Kathail et al., HPL Playdoh Architecture Specification: Version 1.0, Hewlett Packard, Computer Systems Laboratory, HPL-93-80, Feb., 1994, pp. 1-48.

IEEE MICRO, vol. 13, No. 5, Oct. 1, 1993, pp. 24-36, Makato Awaga et al, "The VP 64-Bit Vector Coprocessor: A New Implementation of High-Performance Numerical Computation."

Intel Microprocessors: vol. II, 1993, pp. 2-2, 2-19 to 2-26, 2-80 to 2-83 and 2-122.

Intel Microprocessors: vol. I, 1993, pp. 2-1, 2-18 to 2-26, 2-79 to 2-83 and 2-121 to 2-122.

* cited by examiner

|     | 31      16 | 15      8 | 7      0 |
|-----|------------|-----------|----------|
| EAX |            | AH (100+!P) | AL (000) |
| ECX |            | CH (101+!P) | CL (001) |
| EDX |            | DH (110+!P) | DL (010) |
| EBX |            | BH (111+!P) | BL (011) |
| ESP |            |           | SPL (100+P) |
| EBP |            |           | BPL (101+P) |
| ESI |            |           | SIL (110+P) |
| EDI |            |           | DIL (111+P) |

Note: "+P" = Instruction Includes Register Address Prefix Byte
"+!P" = Instruction Excludes Register Address Prefix Byte

Fig. 2

| | 31 or 63 | 16 15 | 8 7 | 0 |
|---|---|---|---|---|
| EAX | | | AH (x100+!P) | AL (0000+P or x000+!P) |
| ECX | | | CH (x101+!P) | CL (0001+P or x001+!P) |
| EDX | | | DH (x110+!P) | DL (0010+P or x010+!P) |
| EBX | | | BH (x111+!P) | BL (0011+P or x011+!P) |
| ESP | | | | SPL (0100+P) |
| EBP | | | | BPL (0101+P) |
| ESI | | | | SIL (0110+P) |
| EDI | | | | DIL (0111+P) |
| R8 | | | | R8B (1000+P) |
| R9 | | | | R9B (1001+P) |
| R10 | | | | R10B (1010+P) |
| R11 | | | | R11B (1011+P) |
| R12 | | | | R12B (1100+P) |
| R13 | | | | R13B (1101+P) |
| R14 | | | | R14B (1110+P) |
| R15 | | | | R15B (1111+P) |

Note: "+P" = Instruction Includes Register Address Prefix Byte
"+!P" = Instruction Excludes Register Address Prefix Byte

Fig. 4

UNIFORM REGISTER ADDRESSING USING PREFIX BYTE

This application claims benefit of priority to Provisional Application Ser. No. 60/224,368 filed Aug. 9, 2000.

BACKGROUND OF THE INVENTION

1. Field of the Invention

This invention is related to the field of processors and, more particularly, to register addressing within processors.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

Unfortunately, the x86 architecture includes certain features which complicate design of compilers for the architecture. For example, it is sometimes desirable to manipulate a byte of information as a variable. The x86 architecture provides for byte addressability of some of its registers, but not all. Additionally, those registers which are byte addressable provide for byte addressing of both the least significant byte and the next to the least significant byte. These features complicate the compiler's mapping of byte variables to registers in several ways. For example, if the compiler has already assigned all of the byte addressable registers to other (multi-byte) variables and a byte variable is encountered, the compiler must rearrange register assignments to accommodate the byte variable in a byte addressable register, write the previously assigned variable to memory to assign the byte addressable register to the byte variable, or assign the byte variable to a non-byte addressable register (and thus eliminate the non-byte addressable register's use for a multi-byte variable). Alternatively, the compiler may reserve one or more of the byte addressable registers for allocation to byte variables. However, in this case, the registers may not be assigned to other variables if not enough byte variables are encountered. Furthermore, mapping multiple byte variables to the same multi-byte register (since the least significant and next to least significant bytes are both byte addressable) may complicate register assignment by requiring the compiler to manage both the register name and two subfields within the register for assignment to two different byte variables.

SUMMARY OF THE INVENTION

A processor which changes the mapping of register addresses to registers dependent on an instruction field is described. In one particular embodiment, the mapping may be changed for byte addressing of the registers. A register mapping in which each register address maps to either the least significant byte or the next least significant byte of a subset of the registers may be supported, as well as a register mapping in which each register address maps to the least significant byte of each register, in one implementation. Such an implementation may, for example, maintain compatibility with the x86 byte register address mappings while allowing a more uniform mapping of byte register addresses (which may simplify compiler design). In one particular implementation, the instruction field may be a prefix field (e.g. a prefix byte).

The processor may provide for uniform addressing of registers (e.g. byte addressing of the registers) responsive to a prefix field, in other embodiments, irrespective of the addressing provided if the prefix field is not included, or is encoded differently than the encoding which results in the uniform addressing. Compiler register assignment may be simplified via the uniform register addressing.

Broadly speaking, a processor is contemplated comprising a register file and an execution core coupled thereto. The register file includes at least a first register and a second register. The execution core is further coupled to receive an instruction including a register address field having a first encoding. Dependent on a first field of the instruction, the execution core is configured to select which of a first portion of the first register and a second portion of the second register is used as an operand of the instruction responsive to the first encoding of the register address field.

Additionally, an apparatus is contemplated comprising one or more storage locations and a processor coupled thereto. The one or more storage locations correspond to at least a first register and a second register. The processor is further coupled to receive an instruction including a register address field having a first encoding. Dependent on a first field of the instruction, the processor is configured to select which of a first portion of the first register and a second portion of the second register is used as an operand of the instruction responsive to the first encoding of the register address field.

Moreover, a method is contemplated. An instruction is received which includes a register address field having a first encoding. Which of a first portion of a first register and a second portion of a second register is used as an operand of the instruction is selected responsive to the first encoding. The selecting is dependent on a first field of the instruction.

Still further, a processor is contemplated comprising a register file and an execution core coupled thereto. The register file includes a plurality of registers. The execution core is configured, dependent on a first field of an instruction also having a register address field, to: (i) select a first portion of one of the plurality of registers as an operand of the instruction, the one of the plurality of registers selected responsive to a value of the register address field; or (ii) select one of a first portion or a second portion of one of a subset of the plurality of registers as the operand of the instruction, the first portion or the second portion and the one of the subset selected responsive to a value of the register address field.

Furthermore, an apparatus is contemplated comprising one or more storage locations and a processor coupled thereto. The one or more storage locations correspond to a plurality of registers. The processor is configured, dependent on a first field of an instruction also having a register address field, to: (i) select a first portion of one of the plurality of registers as an operand of the instruction, the one of the plurality of registers selected responsive to a value of the register address field; or (ii) select one of a first portion or a second portion of one of a subset of the plurality of registers as the operand of the instruction, the first portion or the second portion and the one of the subset selected responsive to a value of the register address field.

Additionally, a method is contemplated. The method includes: (a) mapping each value of a register address field of an instruction to a first portion of a different one of the plurality of registers; or (b) mapping each value of the register address field to a first portion or a second portion of different ones of a plurality of the plurality of registers; wherein (a) or (b) is performed dependent on a first field of the instruction.

BRIEF DESCRIPTION OF THE DRAWINGS

The following detailed description makes reference to the accompanying drawings, which are now briefly described.

FIG. 2 is a block diagram illustrating one embodiment of addressing registers.

FIG. 4 is a block diagram illustrating a second embodiment of addressing registers.

Figure 1:
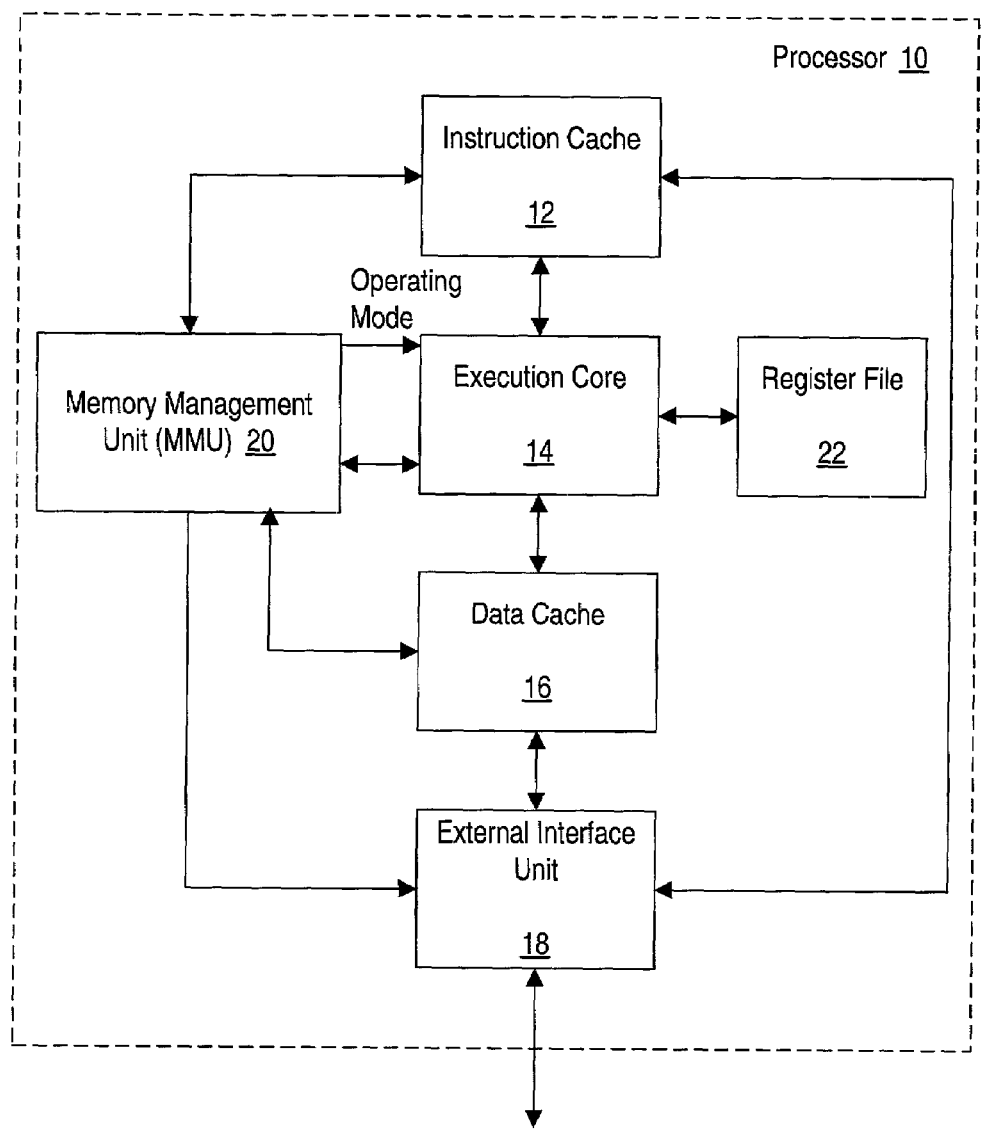
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Processor 10 is configured to establish an operating mode. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands. Since there is more than one operating mode, the operating mode in effect at any given time may be described as being the "active" operating mode.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

One way in which an instruction's encoding may override the default operand size is if the instruction specifies an 8 bit (one byte) operand size. The opcode of the instruction may implicitly specify the one byte operand size (e.g., if the instruction is defined to operate on one byte operands). Alternatively, another instruction field may be used to encode the one byte operand size. Furthermore, an embodiment of processor 10 may include an operating mode in which the default operand size is one byte.

For an instruction specifying a one byte operand size, execution core 14 may read one byte of a register as a source operand of the instruction and/or update one byte of the register in register file 22. The instruction may include one or more register address fields used to specify the register. More particularly, in one embodiment, the byte may be one of the least significant two bytes of a subset of the registers in register file 22 or may be the least significant byte of any of the registers in register file 22, dependent on an instruction field. The instruction field may be a prefix field, and more particularly a prefix byte of the instruction. In other words, which register is specified via a particular encoding in the register address field is dependent on the instruction field (e.g. the prefix field). Execution core 14 may interpret both the instruction field and the register address field to select the register within register file 22 for access (read and/or write) in response to the instruction.

By having an instruction field which changes the mapping of register addresses to registers, a previous mapping of the register addresses may be maintained for compatibility while a mapping which may simplify compiler design may also be provided. For example, mapping of the register addresses to one of the two least significant bytes of certain registers may provide compatibility with the x86 architecture, while mapping the register addresses to the least significant byte of each register may simplify compiler design by allowing any register to be used to store a byte variable. As an example, an instruction field which changes the mapping between two supported mappings could be a bit, with the bit being set selecting one mapping and the bit being clear selecting the other mapping. An instruction field which changes the mapping between up to for supported mappings could be two bits, etc.

As used herein, a "field" of an instruction is one or more bits in the instruction which are assigned a meaning as a whole. Various encodings of the field may be interpreted by processor 10 according to the assigned meaning. A register address field is a field which is encoded with a register address specifying a register as defined in the architecture which defines the instruction. In other words, each value of the register address field (each register address) is "mapped" to a different register defined in the architecture. Exemplary register address mappings are shown below. The registers may be in register file 22. A "prefix field" is a field which precedes the opcode of the instruction. Prefix fields may optionally be included or not included in an instruction. In one embodiment, the presence or absence of a particular prefix field may be used to indicate which of the above mentioned mappings of the register address is used by execution core 14. In other embodiments, the encoding of the instruction field or prefix field may be used to indicate which mapping is used. The "prefix byte" is a byte-sized prefix field.

Instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice. Execution core 14 may include microcoding for one or more instructions or exception situations, in combination with any of the above constructions.

Register file 22 may include one or more general purpose registers, zero or more floating point registers, zero or more multimedia registers, etc. In one embodiment, register file 22 may employ 64 bit registers which may be accessed as 64 bit, 32 bit, 16 bit, or 8 bit registers as indicated by the operating mode of processor 10 and any overrides for a particular instruction. In an embodiment compatible with the x86 architecture, the registers included in register file 22 may include the EAX, EBX, ECX, EDX, EDI, ESI, ESP, and EBP registers defined in the x86 processor architecture. In an embodiment compatible with the x86 architecture and including extensions for 64 bit processing, the registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Additionally, in one embodiment, register file 22 may include additional registers addressed using a register extension prefix byte described below. Register file 22 may further include the RIP register, which may be a 64 bit version of the EIP register. Alternatively, execution core 14 may employ a form of register renaming in which any register within register file 22 may be mapped to an architected register. The number of registers in register file 22 may be implementation dependent for such an embodiment. However, at any given point, a register in register file 22 may represent the committed state of a given architected register and another register may represent the speculative state of the given architected register. The register storing the speculative state is generally the register which may be addressed if the architected register is to be read (except during exception conditions). Embodiments employing register renaming are contemplated within the scope of the present register access mechanism using an instruction field to override the original register address mapping. In such embodiments, the architected register to be accessed is selected using the register address field and the instruction field, and then the architected register may be mapped to the register storing its speculative or committed state.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

In one particular embodiment, processor 10 may employ a processor architecture compatible with the x86 architecture (also known as the IA-32 architecture) and including additional architectural features to support 64 bit processing. More particularly, the processor architecture employed by processor 10 may define a mode, referred to below as "long mode". Long mode is a mode in which 64 bit processing is selectable as an operating mode, as well as 32 bit or 16 bit processing as specified in the x86 architecture. More particularly, long mode may provide for an operating mode in which virtual addresses may be greater than 32 bits in size.

In this particular implementation, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, a control register may store an enable indication (LME) which is used to enable transition to long mode and an LMA indication indicating whether or not long mode is active. In long mode, an operating mode in which the default address size is greater than 32 bits ("32/64 mode") as well as certain compatibility modes for the 32 bit and 16 bit operating modes may be available using the segment descriptor indications. The default operand size may be 32 bits in 32/64 mode, but instructions may override the default 32 bit operand size with a 64 bit operand size when desired. If the LME indication is in an enabled state, then long mode may be activated. If the LME indication is in a disabled state, then long mode may not be activated. In one embodiment, the default address size in 32/64 mode may be implementation-dependent but may be any value up to and including 64 bits. Furthermore, the size of the virtual address may differ in a given implementation from the size of the physical address in that implementation.

In one embodiment, use of the instruction field to change the mapping of registers may be dependent on the operating mode. In one or more operating modes, the instruction field may be used, while in other operating modes the instruction field may be ignored. For example, in the particular implementation described above, the instruction field may be used in the 32/64 mode and may be ignored in other operating modes.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

While the processor architecture described herein may be compatible with the x86 processor architecture for 16 and 32 bit modes, in one embodiment, other embodiments may employ any 16 and 32 bit modes. The other embodiments may or may not be compatible with the x86 processor architecture or any other processor architecture. It is further noted that, while a specific set of information is described herein as being used to generate the operating mode, any combination of indications and/or information from memory data structures such as segment descriptor tables and page tables may be used to generate the operating mode in various embodiments.

FIGS. 2–7 below describe various embodiments which may be compatible with the x86 architecture. However, as noted above, any architecture may be used in other embodiments. The prefix byte used to change the byte addressed by various encodings of the register address field or fields of an instruction is referred to below as the "register address prefix byte".

Turning now to FIG. 2, a block diagram is shown illustrating one embodiment of mapping register addresses to bytes of registers. Other embodiments are possible and contemplated. The embodiment of FIG. 2 may be compatible with the x86 architecture, along with use of the register address prefix byte to change the register addressing from that specified in the x86 architecture. More particularly, if an instruction specifying a byte operand does not include the register address prefix byte, the x86 register address mapping may be used. If the instruction specifying a byte operand includes the register address prefix byte, the changed register address mapping may be used.

The registers shown in FIG. 2 are illustrated with the least significant bit to the right and the most significant bit to the left. Thirty-two bits are illustrated in FIG. 2, although other embodiments may employ other sizes. The x86 register names are illustrated to the left of the registers (EAX, ECX, etc.). Bit ranges for each of the registers are illustrated above the EAX register.

Each byte addressable with or without the register address prefix byte is illustrated in FIG. 2 for one embodiment. The register name used to specify that byte in instruction mnemonics is illustrated. Additionally, an expression in parentheses illustrates the instruction encoding used to address that byte. A three bit binary number is illustrated in the expression, which is the register address encoding used to address that byte. Thus, three bit register address fields are used in this embodiment. Additionally, some of the expressions include a "+!P" or a "+P". The "+!P" indicates that the instruction does not include the register address prefix byte. The "+P" indicates that the instruction does include the register address prefix byte. For example, the AH register (the next to least significant byte in the EAX register, or bits 15:8 of the EAX register) is addressed using register address field encoding 100 (in binary) and not including the register address prefix byte in the instruction. On the other hand, the SPL register (the least significant byte of the ESP register) is addressed using register address field encoding 100 (in binary) and including the register address prefix byte in the instruction. Some byte registers are addressed the same way regardless of whether the register address prefix byte is used or not used, in the embodiment of FIG. 2. These are the AL, CL, DL, and BL registers in FIG. 2, and thus the register addresses of 000, 001, 010, and 011 may be used to address these register irrespective of whether or not the register address prefix byte is included in the instruction.

Accordingly, instructions not including the register address prefix byte may be used to address the legacy x86 byte registers, which are stored in a subset of the registers available in the x86 architecture and in the least significant byte and next to least significant byte of those registers (e.g. AH, AL, CH, CL, DH, DL, BH, and BL in FIG. 2). The bytes located in the next to least significant byte of the corresponding register (AH, CH, DH, and BH) are referred to herein as the "high byte" and the bytes located in the least significant byte of the corresponding register (AL, CL, DL, and BL in FIG. 2) are referred to as the "low byte". Instructions including the register address prefix byte (or optionally not including the prefix byte for the byte registers that are a don't care in FIG. 2) may be used to address a set of bytes which are uniformly located in each of the registers illustrated in FIG. 2, in the least significant byte of those registers.

It is noted that, while the bytes addressable as byte operands are shown in the least significant and next to least significant bytes of the registers, other embodiments may use other bytes within the registers, as desired.

Figure 3:
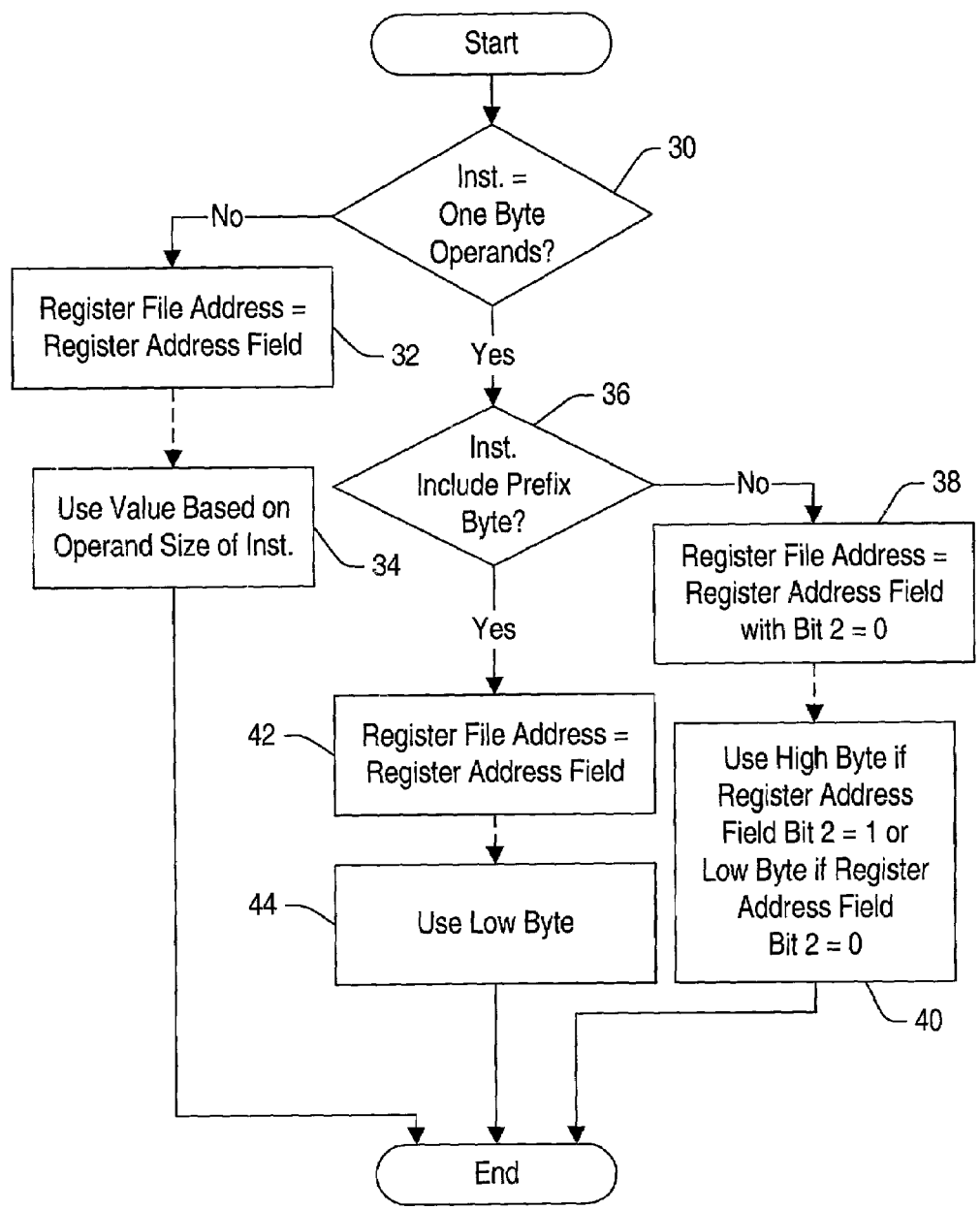
FIG. 3 is a flowchart illustrating operation of one embodiment of an execution core when executing an instruction addressing registers as shown in FIG. 2.

FIG. 3 is a flowchart illustrating certain operations of one embodiment of execution core 14 when executing an instruction specifying byte operands using the register mappings illustrated in FIG. 2. Other embodiments are possible and contemplated. While the blocks shown are illustrated in an order for ease of understanding, the blocks may be performed in any order. Furthermore, the blocks may be performed in parallel in combinatorial logic circuitry within execution core 14 or may be performed in microcode included within execution core 14. The dashed lines between blocks in FIG. 3 are used to illustrated blocks which may be performed at a later time than the preceding block (e.g. in a later pipeline stage of execution core 14), as desired.

For the illustrated embodiment, the registers shown in FIG. 2 are mapped to register file addresses 0 through 7. In other words, the least significant bits of the register file address may equal the register address field from the instruction for the registers shown in FIG. 2. Other registers which may be included in register file 22 (e.g. floating point registers, multimedia registers, etc.) may have register file addresses greater than 7. In other embodiments, the register file addresses for the registers shown in FIG. 2 may be different, and thus a register file address may be generated according to the register address field and the mapping of register addresses to register file addresses. Furthermore, as mentioned above, in embodiments in which register file 22 comprises rename registers in which the state of the architected registers may be stored in any of the registers, generating the register file address may include mapping the architected register address to a physical register address based on which register is storing the state of the selected architected register.

Execution core 14 determines if the instruction specifies one byte operands (decision block 30). If the instruction does not specify one byte operands (e.g. the operands are 16 bit or 32 bit), the register file address may be equal to the register address field of the instruction (block 32). The value from the addressed register may then be used in accordance with the operand size of the instruction (block 34). On the other hand, if the instruction does specify one byte operands, execution core 14 determines if the instruction includes the register address prefix byte (decision block 36).

If the instruction does not include the register address prefix byte, execution core 14 generates the register file address of the corresponding register. In the embodiment of FIG. 2, the register address field encoding for the high byte and the low byte of a given register differ in that the high byte register address has the most significant bit (bit 2) set, while the low byte register address has the most significant bit (bit 2) clear. Accordingly, the register file address for the register including the byte may be generated by clearing bit 2 and using the remaining address bits unmodified (block 38). The byte used as the operand is either the high byte (if bit 2 is set) or the low byte (if bit 2 is clear) (block 40).

If the instruction does include the register address prefix byte, execution core 14 may form the register file address using the register address field as the least significant bits of the register file address (block 42). Execution core 14 may then use the low byte of the value from the register as the operand of the instruction (block 44).

In one embodiment, execution core 14 may read the entire value of a register used as an operand of an instruction, and allow the execution logic to select the portion of the value used as a source operand (if the operand size is less than the register size) or, if the operand is a destination for the result of the instruction (and the operand size is less than the register size), mux in the result with the unmodified contents of the register to write back the full value in the register. In this manner, register file 22 may be implemented with a single write enable for each write port (rather than multiple write enables for different portions of the register). It is further noted that the discussion herein may refer to using a value as an operand. An operand may be a source operand, a destination operand, or both. Source operands are read from their storage locations and operated upon to produce a result. The result is the destination operand, and is written to the destination operand storage location. Thus, a source operand is used by being read and operated upon, and a destination operand is used by writing the destination storage location with the result.

Turning next to FIG. 4, a block diagram is shown illustrating a second embodiment of mapping register addresses to bytes of registers. Other embodiments are possible and contemplated. The embodiment of FIG. 4 may be compatible with the x86 architecture, along with use of the register address prefix byte to change the register addressing from that specified in the x86 architecture. More particularly, if an instruction specifying a byte operand does not include the register address prefix byte, the x86 register address mapping may be used. If the instruction specifying a byte operand includes the register address prefix byte, the changed register address mapping may be used. Additionally, in the embodiment of FIG. 4, the register address prefix byte may also be a register extension prefix byte providing for additional registers. The register extension prefix byte may include bits which can be concatenated with the register address field bits to provide a larger register address field. For example, in the illustrated embodiment, one extra register address bit is provided in the register extension prefix byte for each register address field, doubling the number of addressable registers. While the register address/register extension prefix byte may be the same byte, alternatively two separate prefix bytes or fields may be provided, one for the register address modification and one for register extension. Accordingly, the discussion below may use register address prefix byte to refer to the register address mapping function of the byte and may use register extension prefix byte to refer to the register extension function of the byte.

The registers shown in FIG. 4 are illustrated with the least significant bit to the right and the most significant bit to the left. Thirty-two bit and 64 bit alternatives are illustrated in FIG. 4, although any size may be used. Thirty-two bits may be the default operand size. In one embodiment, the register extension prefix byte may also include a bit which can be used to override the default 32 bit operand size (e.g. in the 32/64 mode described above). The x86 register names are illustrated to the left of the registers (EAX, ECX, etc.) which correspond to those defined in the x86 architecture. The additional registers provided via the register extension prefix byte are labeled R8–R15. Bit ranges for each of the registers are illustrated above the EAX register.

Similar to the embodiment of FIG. 2, each byte addressable with or without the register address prefix byte is illustrated in FIG. 4 for one embodiment. The register name used to specify that byte in instruction mnemonics is illustrated. Additionally, an expression in parentheses illustrates the instruction encoding used to address that byte. The embodiment of FIG. 4 uses the same notation for the register address prefix byte as the embodiment of FIG. 2 uses. However, in the embodiment of FIG. 4, 4 bit register address fields are used to address the sixteen registers provided. As mentioned above, the additional register address bit may be supplied from the register extension prefix byte.

If the register extension prefix byte is not provided in the instruction (and in one embodiment, the register address prefix byte and the register extension prefix byte are the same byte), then the additional register address bit is not supplied. Accordingly, the expressions shown in FIG. 4 include a don't care "x" for the most significant bit in cases in which the register address/extension prefix byte is not included (e.g. the AH, AL, CH, CL, DH, DL, BH, and BL registers). Execution core 14 may force this bit to zero.

As with FIG. 2, legacy addressing according to the x86 architecture may be provided for instructions which do not include the register address prefix byte. Additionally, instructions which do include the register address prefix byte may be used to address a set of bytes which are uniformly located in each of the registers illustrated in FIG. 2, in the least significant byte of those registers. Through the register extension prefix byte, the number of byte registers which may be available may be doubled.

It is noted that, while the bytes addressable as byte operands are show in the least significant and next to least significant bytes of the registers, other embodiments may use other bytes within the registers, as desired.

A flowchart similar to the flowchart of FIG. 3 may be used for an embodiment of execution core 14 for use with the registers as illustrated in FIG. 4, with the addition of using the register extension prefix byte to generate the most significant bit of the register file address.

Figure 5:
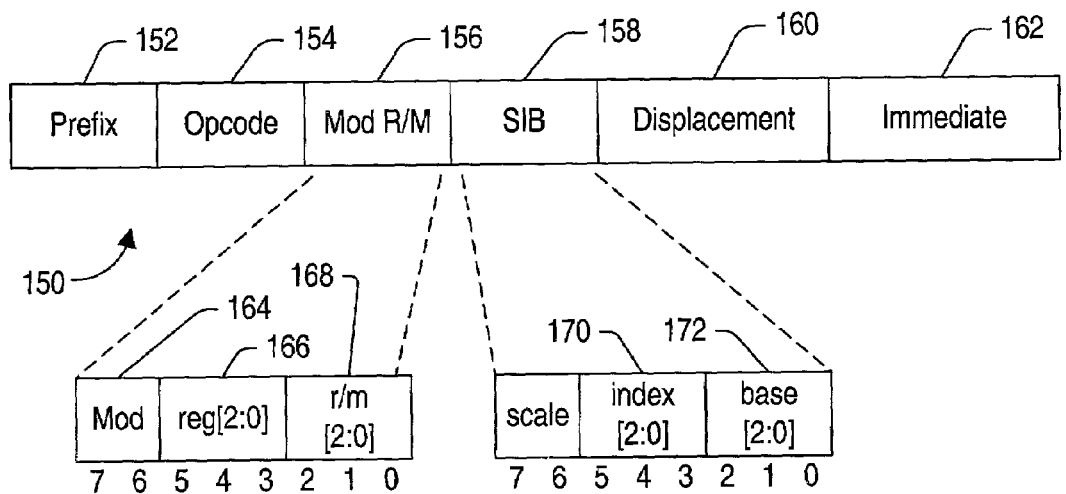
FIG. 5 is a block diagram of one embodiment of an instruction.

Turning now to FIG. 5, a block diagram of one embodiment of an instruction 150 is shown. Instruction 150 may be a variable byte length instruction (e.g. an instruction compatible with the x86 instruction set). Other embodiments are possible and contemplated, including fixed length instructions. In the embodiment of FIG. 5, instruction 150 includes a prefix field 152, an opcode field 154, an addressing mode (Mod R/M) field 156, a scale-index-base (SIB) field 158, a displacement field 160, and an immediate field 162. Mod R/M field 156 and SIB field 158 are shown in exploded view.

Prefix field 152 may include one or more optional prefixes to the instruction. The prefix field may include various overrides (e.g. operand size or address size overrides, segment register overrides, etc.). Additionally, prefix field 152 may include the register address prefix and/or the register extension prefix. In one embodiment, the combined register address/extension prefix immediately precedes the opcode field 154. Each optional prefix may be a byte, and thus prefix field 152 may comprise one or more bytes.

Displacement and immediate fields 160 and 162 are each optional, and may be used to provide a displacement for address calculations and an immediate operand, respectively. In one embodiment, each of displacement and immediate fields 160 and 162 may comprise 1, 2, or 4 bytes.

Opcode field 154 includes the opcode of the instruction, and may be a byte in size. Each of the Mod R/M and SIB fields 156 and 158 may be optional and may be a byte in size in the present embodiment, as illustrated in exploded view.

Mod R/M field 156 includes a Mod field 164, a reg field 166, and an r/m field 168. Reg field 166 and r/m field 168 may both be used, in various encodings of the Mod field 164, as register address fields. Each field includes 3 bits.

SIB field 158 includes an index field 172 and a base field 174. Each of index field 172 and base field 174 may be used in various encodings as a register address field. Each field includes 3 bits.

At most, three register address fields may be included in an instruction from among reg field 166, r/m field 168, index field 170, and base field 172. Additionally, certain instruction opcodes include a register address field in opcode field 154 (and the Mod R/M and SIB fields 156 and 158 are not included in such instructions). Accordingly, the register extension prefix may be capable of providing additional register address bits for up to three register address fields.

Figure 6:
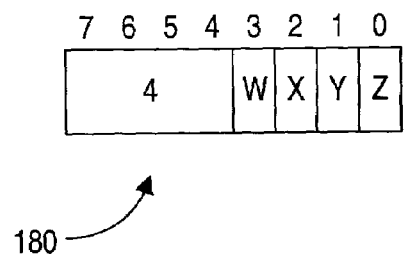
FIG. 6 is a block diagram of one embodiment of a prefix byte.

FIG. 6 is a block diagram of one embodiment of a combined register address/extension prefix byte 180. Other embodiments are possible and contemplated. In the embodiment of FIG. 6, the most significant four bits of prefix byte 180 are coded to 4 (0100 binary) to identify prefix byte 180 among the prefix and opcode bytes. Additionally, prefix byte 180 includes W, X, Y, and Z fields. The W field may be used to specify a 64 bit operand size override for the instruction. The X field may be used to provide the most significant register address bit for reg field 166. The Y field may be used to provide the most significant register address bit for index field 170. The Z field may be used to provide the most significant register address bit for r/m field 168, base field 172, and the opcode register address field mentioned above.

As mentioned above, other embodiments may include separate register address and register extension prefix bytes. In such embodiments, as well as embodiments in which register extension is not implemented, a prefix byte encoding may be assigned to the register address prefix byte. Furthermore, while a prefix byte is used in the present embodiment, a prefix field of any size or any instruction field may be used to specify the modification of the register address mapping.

Software Embodiments

While the above description may generally have described a processor which may directly support, in hardware, the processor architecture having the features described above, it is contemplated that other processor embodiments may not directly implement the processor architecture. Instead, such embodiments may directly implement a different processor architecture (referred to below as a native processor architecture, which may define a native instruction set including native instructions). Any native processor architecture may be used. For example, the MIPS, Power PC, Alpha, Sparc, ARM, etc. architectures may be used. The processor architecture may be implemented in software executing on the native processor architecture in a variety of fashions, using any native processor architecture such as, for example, the Crusoe products of Transmeta Corporation.

Generally, a processor embodiment implementing a native processor architecture different than the processor architecture described above (referred to below as the non-native processor architecture) may support the non-native processor architecture in a variety of fashions. For example, such a processor embodiment may execute interpreter software which reads each non-native instruction in a non-native code sequence as data, and executes various software routines which emulate the defined operation of the non-native instruction as defined in the non-native processor architecture. Alternatively, translator software may be executed. The translator software may translate the non-native instructions in the code sequence to an equivalent set of native instructions defined by the native instruction set architecture. The native code sequence may be stored in memory, and may be executed instead of the corresponding non-native code sequence. In yet another alternative, a mixture of interpretation and translation may be used. For example, the code sequence may be interpreted, but the interpreter may also generate statistics about which parts of the code sequence are being most frequently executed. The most frequently executed portions may then be translated to native code sequences.

In any of the above methods, the architected state defined by the non-native processor architecture may be maintained by the combination of the processor and the software (interpreter or translator) in a variety of fashions. For example, the non-native architected state may be mapped to memory locations in a memory addressable by the processor, to general registers defined by the native processor architecture (by software convention, either in the interpreter or in the translator), or the processor may directly support the non-native architected state by defining registers or other storage hardware within the processor that corresponds to the non-native architected state. The non-native architected state may be stored using any combination of the above methods, as desired.

Generally, the architected state includes any state defined to exist by the architecture. For example, in the above described embodiment, the non-native architected state may include general registers (e.g. RAX, RBX, etc.), segment registers, control registers, other registers such as the model specific registers (MSRs), etc. Additionally, the architected state may include data structures defined for the operating system to create, such as the descriptor tables, page tables, task state segments, etc.

Figure 7:
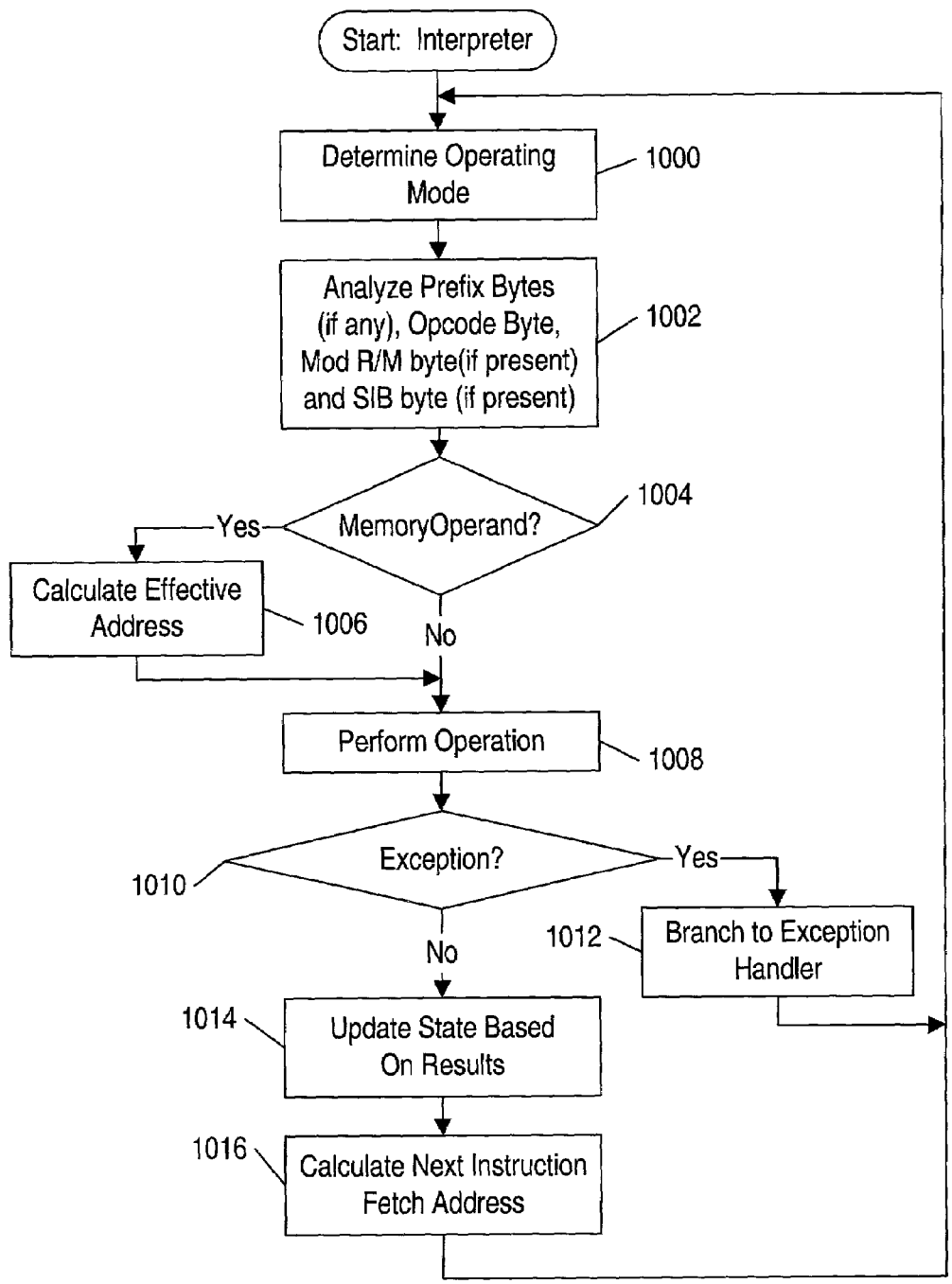
FIG. 7 is a flowchart illustrating one embodiment of an interpreter.

Turning to FIG. 7, a flowchart illustrating an exemplary interpreter which may be used to interpret non-native instructions is shown. Other embodiments are possible and contemplated. While the blocks shown are illustrated in a particular order for ease of understanding, any suitable order may be used. Furthermore, blocks may be performed in parallel, as desired.

The blocks shown in FIG. 7 illustrate the emulation of one non-native instruction. Generally, the interpreter may execute the blocks shown in FIG. 7 for each non-native instruction to be executed according to the non-native code sequence to be executed.

The interpreter may determine the operating mode for the non-native instruction (block 1000). The operating mode may be determined anew for each non-native instruction, or the resulting operating mode may be stored in a temporary register for access by the interpreter for each non-native instruction. If the resulting operating mode is stored, the interpreter may update the stored operating mode if an instruction modifies the information used to generate the operating mode or interrupt or exception handling causes the operating mode to change.

The interpreter may read the current non-native instruction from memory, and may analyze the non-native instruction to determine the operations to be taken to emulate the non-native instruction (block 1002). The interpreter may read the non-native instruction one byte at a time, or may read a suitable set of consecutive bytes and process the bytes. For example, a native processor architecture in which operands are 32 bit may read 32 bits (4 bytes) of the non-native instruction at a time, and then may process the four bytes before reading any additional bytes.

Generally, the interpreter software may decode the non-native instruction in a manner analogous to processor 10 decoding the instruction in hardware. Thus, for the illustrated non-native processor architecture, which is compatible with the x86 processor architecture, the analyzing of the non-native instruction includes analyzing any prefix bytes which may precede the opcode byte, analyzing the opcode byte, analyzing the addressing mode (Mod R/M) byte (if present), and analyzing the scale-index-base (SIB) byte (if present). Prefix bytes may override the operating mode, and may also include register specifier bits (e.g. the register extension prefix byte). The opcode byte specifies the operation to be performed, and in some cases may include a register specifier or may implicitly specify an operand (e.g. the stack or the stack pointer). The Mod R/M byte specifies operands (including any displacement operands which may follow the Mod R/M byte or the SIB byte, if the SIB byte is present) and may include register specifiers. Finally, the SIB byte may include register specifiers. From the information gained from analyzing the non-native instruction, the interpreter has the information to emulate the non-native instruction (including the operating mode for the non-native instruction, which specifies the operand size and address size of the non-native instruction, operands, the operation to be performed, etc.).

If the non-native instruction includes a memory operand (decision block 1004), the interpreter may calculate the effective address of the instruction (block 1006). If the non-native instruction has a memory operand, some of the operands identified in block 1002 may be address operands used to generate the effective address. Thus, the interpreter may read the address operands from the non-native architected state and may add them to generate an effective address. The size of the effective address may be determined by the address size for the instruction, as determined at blocks 1000 and 1002. It is noted that the native processor architecture may support an address size which is less than the address size supported by the non-native processor architecture. For example, in one exemplary embodiment described above, the virtual address size may be 48 bits in 32/64 mode. The native processor may, for example, support a virtual address size of 32 bits. In such an embodiment, block 1006 may represent a series of calculations in which the least significant bits (e.g. 32 bits) of the virtual address may be calculated, and any carry from the least significant bits may be carried into a calculation of the most significant bits of the virtual address.

The interpreter may then perform the operation specified by the non-native instruction (block 1008). If the non-native instruction includes a memory operand as a source operand, the interpreter may read the memory operand from the effective address calculated at block 1006. Other operands may be read from the non-native architected state. The operation may include an arithmetic operation, a logical operation, a shift, a move to another storage location, etc. The native processor architecture may support an operand size smaller than the operand size of the instruction. In such cases, performing the operation may include multiple calculations on portions of the operand to calculate the result.

The interpreter determines if the non-native instruction resulted in an exception (decision block 1010). Generally, exceptions may occur throughout the execution of the operations specified by the non-native instruction. For example, accessing a source memory operand may result in a page fault before any of the actual instruction operation is performed. During the operations, various architecturally-defined exceptions may also occur. The interpreter may interrupt processing of the non-native instruction upon detecting an exception, and may branch to exception handler instructions (block 1012). The exception handler may be native code or non-native code or a combination thereof, as desired. If the non-native processor architecture specifies the update of any architected state when an exception is taken (e.g. various control registers may store the address of the exception causing instruction, the exception reason, etc.), the interpreter may update the non-native architected state as defined.

It is noted that the interpreter software is executing on the native processor, and thus is subject to experiencing exceptions as defined in the native processor architecture. These exceptions may generally be different from the exceptions detected by the interpreter software, which are exceptions experienced by the non-native code being interpreted according to the non-native processor architecture.

If no exception occurs during emulation of the non-native instruction, the interpreter may update the non-native architected state according to the definition of the non-native instruction (block 1014). Finally, the interpreter may calculate the next non-native instruction fetch address to fetch the next instruction (block 1016). The next fetch address may be sequential to the current non-native instruction, or may be a different address (e.g. if the current non-native instruction is a taken branch, the next fetch address may be the target address of the branch instruction).

It is noted that the interpreter may operate in protected mode, using virtual addresses. In other words, the effective address calculated at block 1006 may be a virtual address which is translated by the translation mechanism specified by the non-native processor architecture to a physical address. The processor may include a translation lookaside buffer (TLB) used to cache translations. The processor may either support reload of the TLB from the non-native translation tables (page tables), or may take an exception on a TLB miss to allow software reload of the TLB.

Generally, the interpreter may perform the flowchart of FIG. 3 at any suitable point in the processing of instructions, e.g. blocks 1000, 1002, 1006 or 1008.

Figure 8:
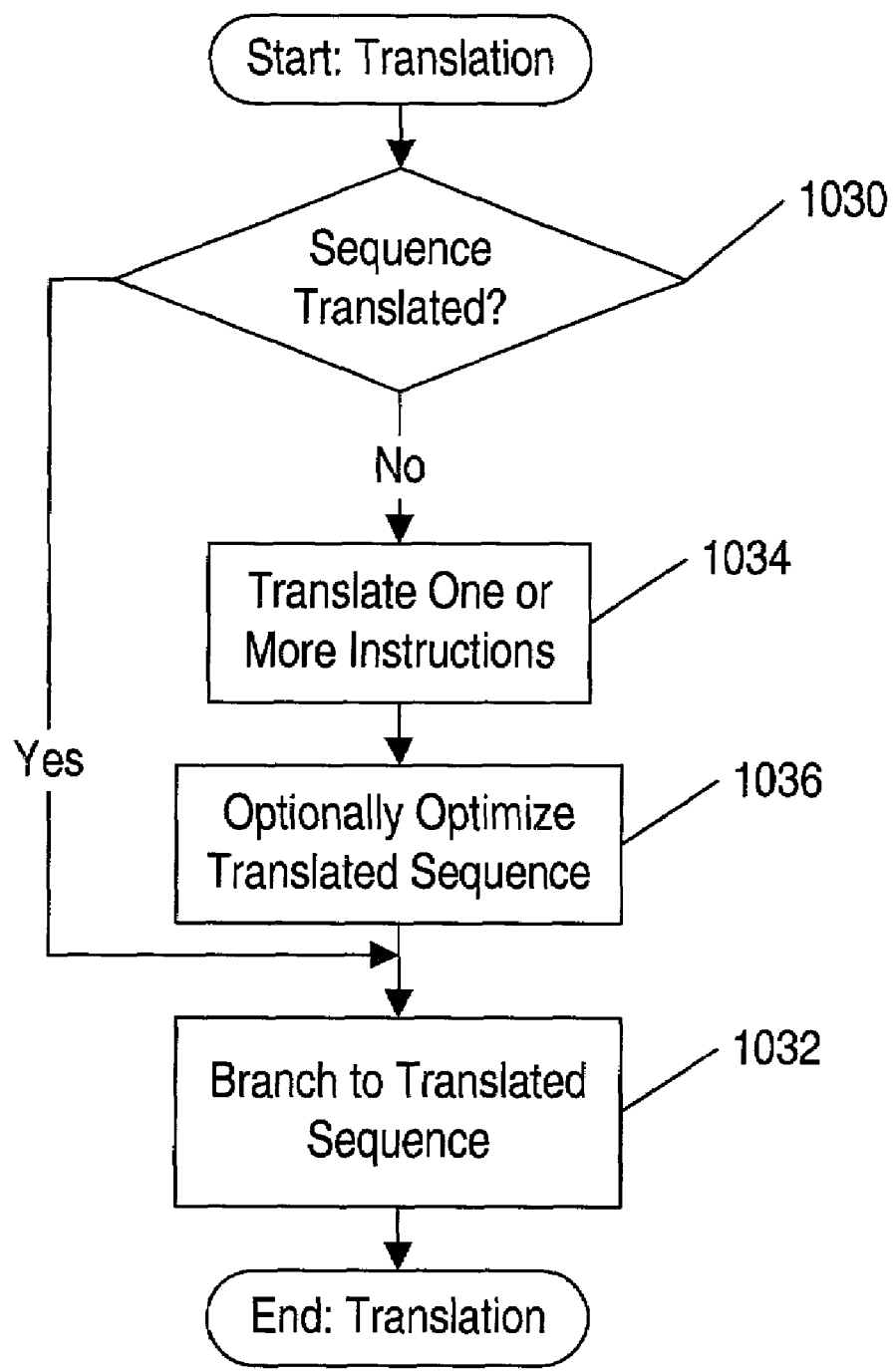
FIG. 8 is a flowchart illustrating one embodiment of a translator.

Turning to FIG. 8, a flowchart illustrating an exemplary translator which may be used to translate non-native instructions in the non-native processor architecture to native instructions in the native processor architecture. Other embodiments are possible and contemplated. While the blocks shown are illustrated in a particular order for ease of understanding, any suitable order may be used. Furthermore, blocks may be performed in parallel, as desired.

The blocks shown in FIG. 8 illustrate the translation of one non-native code sequence responsive to a fetch address for the first instruction in the non-native code sequence. The code translator may translate any number of non-native instructions to produce a translated code sequence having native instructions. For example, the translator may translate from the initial non-native instruction to a basic block boundary (i.e. a branch instruction). Alternatively, the translator may speculatively translate two or more basic blocks or may translate up to a maximum number of non-native or resulting native instructions, if desired.

Generally, the translator may maintain a translation cache which stores translated code sequences previously produced by the translator. The translation cache may identify translated code sequences by the fetch address of the first non-native instruction in the corresponding non-native code sequences. Thus, the translator may determine if a translated code sequence corresponding to the fetch address is stored in the translation cache (decision block 1030). If there is a translated code sequence in the translation cache, the translator may cause the processor to branch to that translated code sequence (block 1032). On the other hand, if there is no translated code sequence, the translator may translate one or more non-native instructions from the non-native code sequence into native instructions in a translated code sequence (block 1034).

Generally, the translator may translate each non-native instruction into one or more native instructions which, when executed, may perform the same operation on the non-native architected state that the non-native instruction would have performed. The translator may generally perform the same decoding of instructions as is performed by the interpreter (block 1002 in FIG. 7) to determine what operations may need to be performed. For example, if the native processor architecture is a load/store architecture in which memory operands are accessed using explicit load/store instructions and other instruction use only register operands, load and store instructions may be used to access the memory operands and other instructions may be used to perform the explicit operation of a non-native instruction having a memory operand. The translated instructions may make use of temporary registers to hold intermediate values corresponding to the execution of the non-native instruction. Additionally, the translated instructions may access the non-native architected state to retrieve operands and may update the non-native architected state with the final results of the non-native instruction. Generally, the native instructions corresponding to the non-native instruction may perform all of the operations defined for the instruction (e.g. blocks 1006, 1008, 1010, 1014, and 1016 in FIG. 7).

Once the translator has determined to terminate translation and save the translated sequence for execution, the translator may optionally optimize the translated code sequence (block 1036). The optimizations may include reordering the translated instructions for quicker execution, eliminating redundancies (e.g. redundant memory references, which may occur if multiple non-native instructions in the source code sequence accessed the same memory location), etc. Any suitable set of optimizations may be used. The resulting translated code sequence may then be stored into the translation cache. Additionally, the processor may branch to the translated code sequence and execute the sequence (block 1032).

It is noted that, while the above description may refer to accessing and/or updating non-native architected state, including various registers, the non-native architected state may be stored in any suitable fashion. For example, architected registers may actually be stored in memory locations, as highlighted above. The mapping of architected registers from the non-native processor architecture to memory locations may be used in either of the interpreter or the translator embodiments, or combinations thereof, to locate the non-architected state used during execution of the non-native instruction or affected by the execution of the non-native instruction. Thus, instructions which access the non-native architected state may perform memory reads/writes or register reads/writes, as the case may be.

Figure 9:
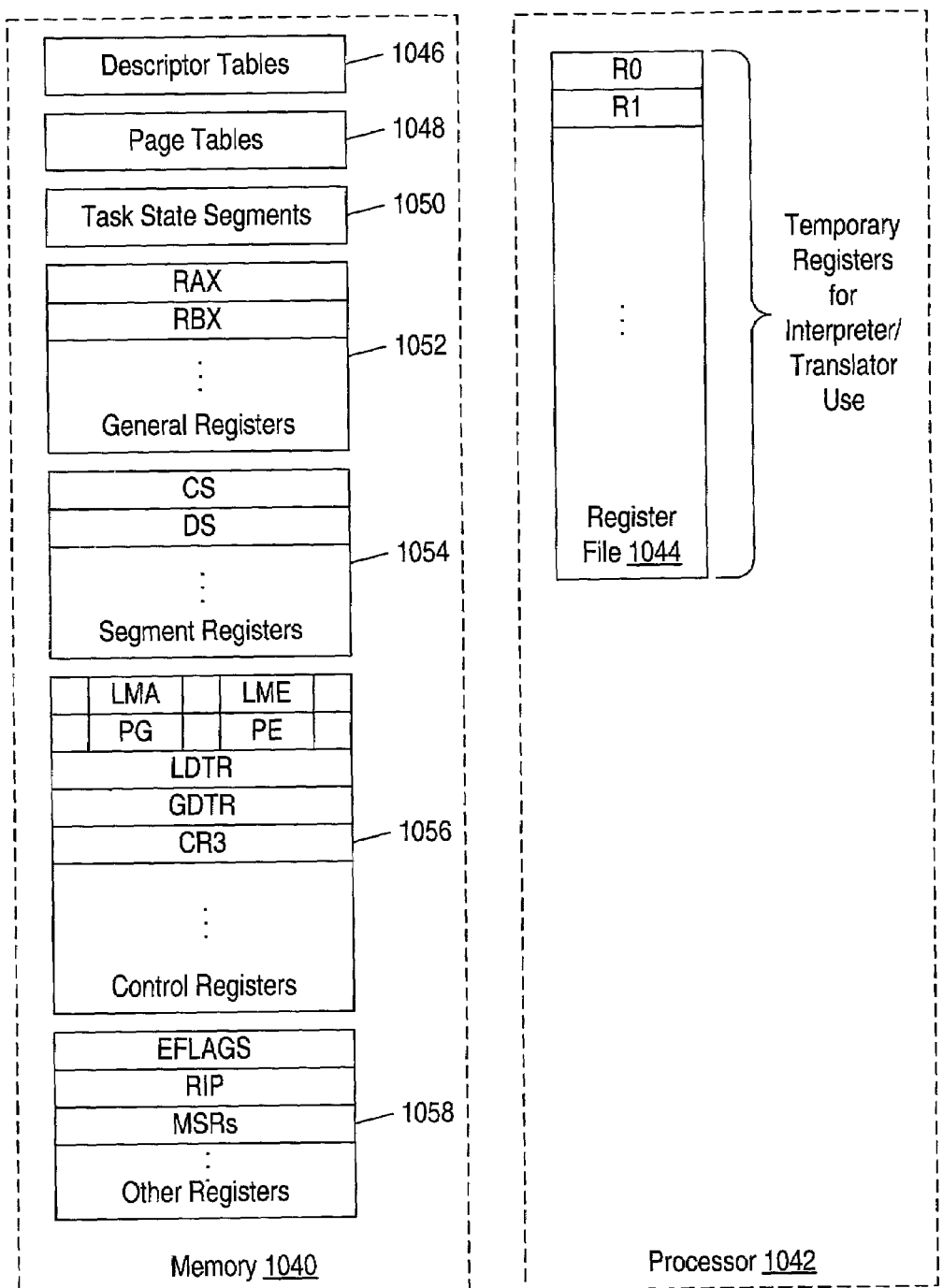
FIG. 9 is a block diagram illustrating one embodiment of mapping non-native architected state.

Turning next to FIG. 9, a block diagram illustrating one exemplary mapping of non-native architected state to either memory locations in a memory 1040 or to processor resources in a native processor 1042. Native processor 1042 includes a register file 1044 including the architected general registers of the native processor architecture. Any number of registers may be provided.

In the embodiment of FIG. 9, all of the non-native architected state is mapped to memory 1040. For example, descriptor tables 1046 (which may include a global descriptor table, a local descriptor table, and an interrupt descriptor table), page tables 1048 (which store virtual to physical address translations), task state segments 1050, general registers 1052, segment registers 1054, control registers 1056, and other registers 1058 may represent non-native architected state.

Thus, in the embodiment of FIG. 9, to access any non-native architected state, a memory access may be performed. For example, if a non-native instruction has one of the general registers as an operand, the interpreter or translated native instruction performs a memory access to the memory location mapped to that general register to access or update that general register. The registers in register file 1044 may be used by the interpreter or translator as temporary registers to hold intermediate results or for other local interpreter/translator state.

General registers 1052 may include integer general registers (e.g. RAX, RBX, etc. as described above), the additional integer general registers defined by the register extension prefix byte, floating point registers, Streaming Single Instruction, Multiple Data (SIMD) Extension (SSE) registers, and the additional SSE registers defined by the register extension prefix byte.

Control registers 1056 may include storage locations corresponding to various control registers defined in the non-native processor architecture. Other registers 1058 includes any remaining architected registers. For example, the EFLAGS register (which stores condition code information), the instruction pointer (RIP) register (which stores the address of the instruction to be executed), and the model specific registers (MSRs) may be included in other registers 1058.

Figure 10:
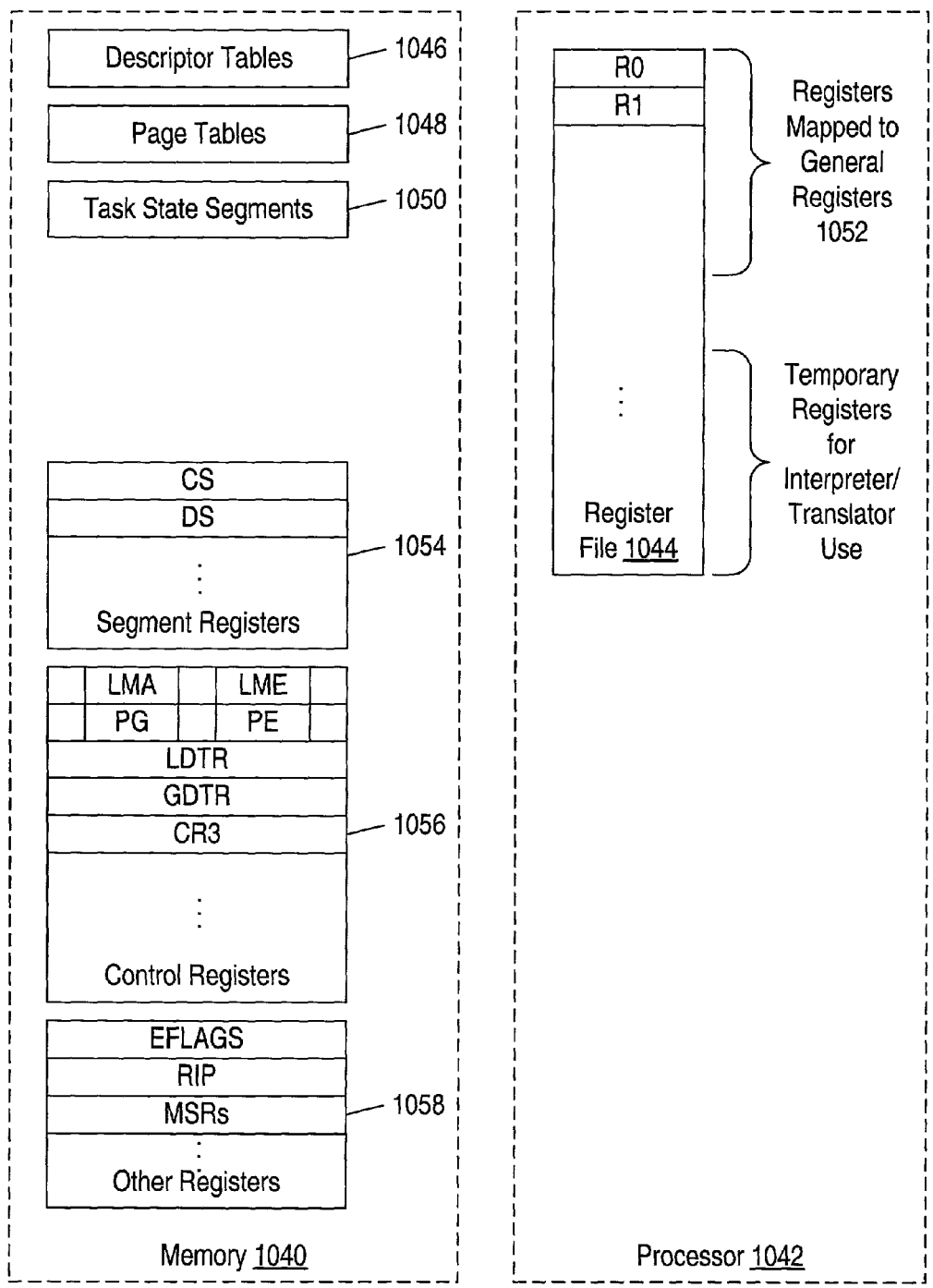
FIG. 10 is a block diagram illustrating a second embodiment of mapping non-native architected state.

While the example of FIG. 9 maps all of the non-native architected state to memory 1040, other embodiments may implement other mappings. In FIG. 10, for example, some of the general registers in register file 1044 are mapped to the general registers 1052. Accordingly, if a non-native instruction has a general register as an operand, the interpreter accesses the corresponding register in register file 1044. Similarly, the translator generates a translated instruction having the corresponding register in register file 1044 as an operand. Other architected state may still be accessed via memory operations in the embodiment of FIG. 10. Other registers in register file 1044 which are not assigned to non-native architected state may again be used as temporary registers for interpreter or translator use, as described above.

While the embodiment of FIG. 10 illustrates mapping the general registers 1052 to registers in register file 1044, any other non-native architected state may be mapped to registers in register file 1044. For example, any of segment registers 1054, control registers 1056, or other registers 1058 (or portions of any of these registers) may be mapped to register file 1044, as desired.

Figure 11:
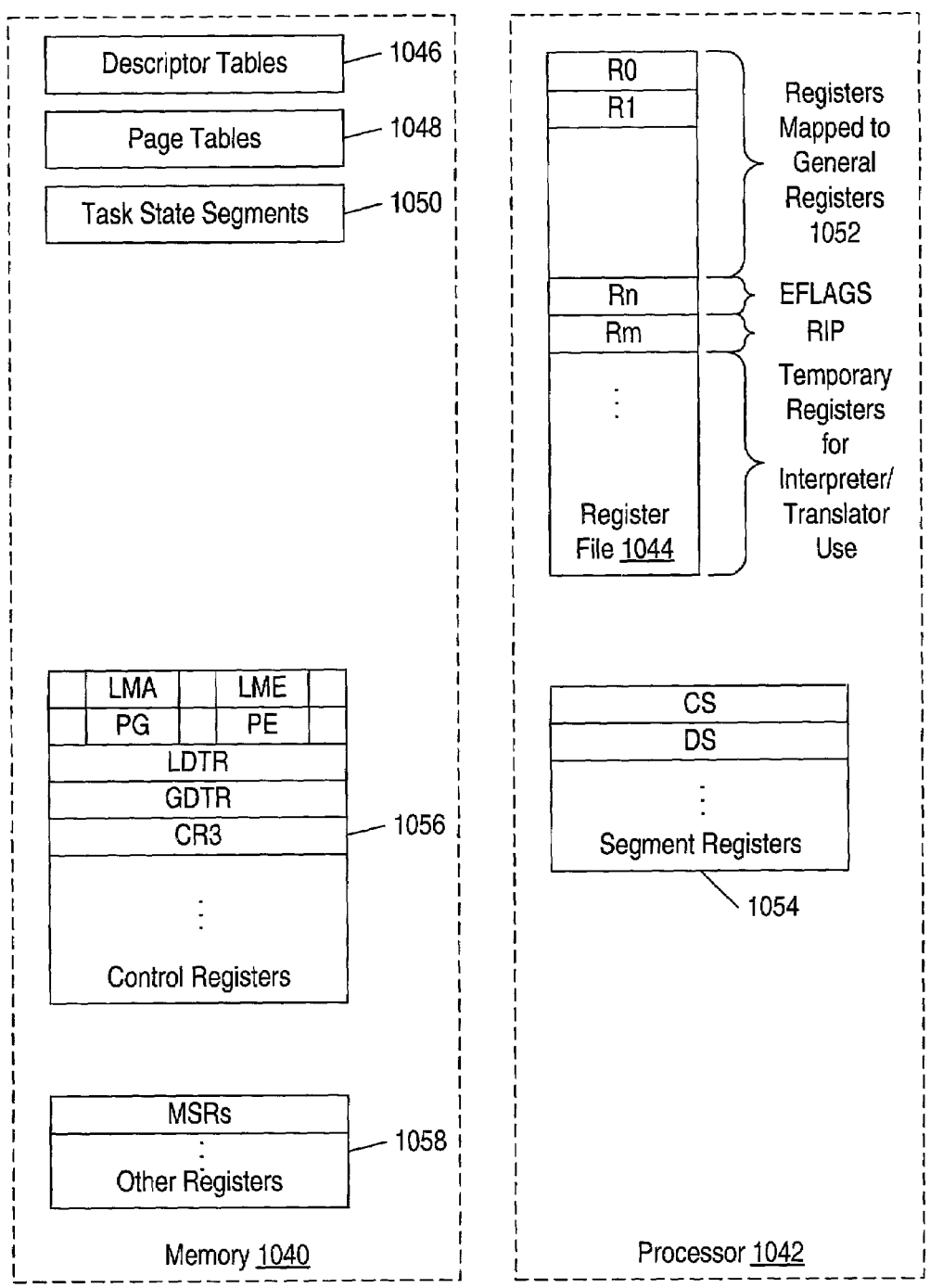
FIG. 11 is a block diagram illustrating a third embodiment of mapping non-native architected state.

FIG. 11 illustrates another example in which the general registers 1052 and the EFLAGS and RIP registers are mapped to registers in register file 1044. Additionally, in the example of FIG. 11, the segment registers 1054 are implemented in hardware in processor 1042. More specifically, processor 1042 may not only implement storage for segment registers 1054, but may also include logic to generate the operating mode for instructions based on the information in the segment registers. Furthermore, for compatibility modes, the logic may include limit checks and attribute checks to ensure that accesses to the segment attempted by the non-native instructions (or the non-native instructions in the interpreter or the translated code sequence which correspond to the non-native instructions) are permitted.

Similarly, other embodiments may implement various control registers 1056 or other registers 1058 in hardware, including corresponding logic to act on the contents of the registers as defined in the non-native architecture. Generally, various embodiments of processor 1042 may implement any non-native architected state in hardware. Certain architected state may generally be implemented in memory since the non-native processor architecture defines the state to be in memory (e.g. descriptor tables 1046, pages tables 1048, and task state segments 1050). Such memory-based architected state may be cached in caches within processor 1042 (e.g. TLBs for page table information, hidden segment register portions for segment descriptor information, etc.).

As the above discussion illustrates, the non-native architected state may be stored in any suitable storage location. Generally, a storage location is a location capable of storing a value. Suitable storage locations may include, in various embodiments, a memory location, a general register mapped to the non-native architected state, or a special purpose register (which may include additional hardware to interpret the contents of the register), depending upon the embodiment. Additionally, suitable storage locations could include a scratch pad RAM (such as a portion of a cache predetermined to be used as scratch pad RAM).

Figure 12:
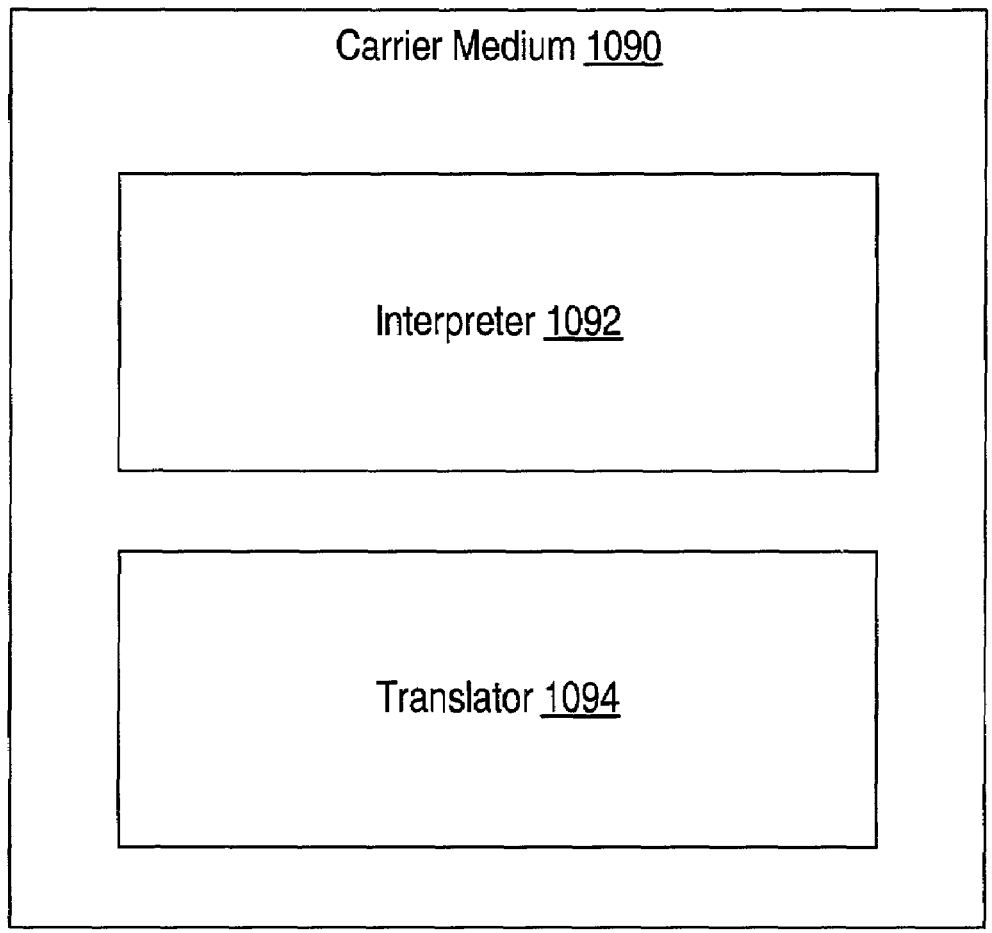
FIG. 12 is a block diagram of one embodiment of a carrier medium.

FIG. 12 is a block diagram of one embodiment of a carrier medium 1090. Other embodiments are possible and contemplated. In the embodiment of FIG. 12, carrier medium 1090 stores an interpreter program 1092 and a translator program 1094.

Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link. Carrier medium 1090 may thus be coupled to a computer system including processor 1042, may be part of a computer system including processor 1042, or may be a communication medium on which the computer system is capable of communicating. Computer systems including processor 1042 may be of any construction. For example, computer systems similar to those shown in FIGS. 13 and 14 may be suitable.

Interpreter program 1090 may operate according to the flowchart of FIG. 7. Translator program 1094 may operate according to the flowchart of FIG. 8. Generally, interpreter program 1092 and translator program 1094 may each comprise code sequences including native instructions.

Computer Systems

Figure 13:
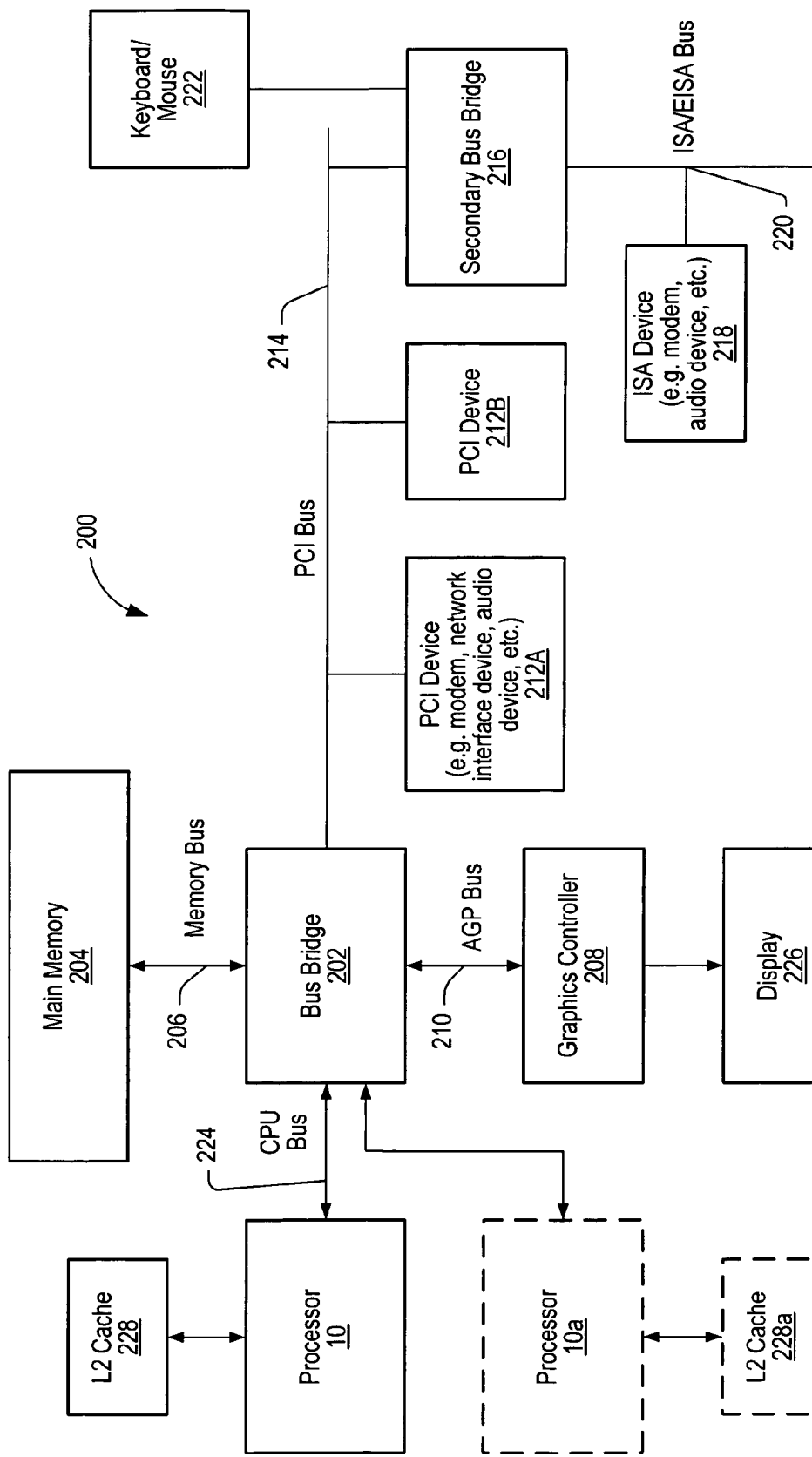
FIG. 13 is a block diagram of one embodiment of a computer system including the processor shown in FIG. 1.

Turning now to FIG. 13, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 13) or may share CPU bus 224 with processor 10. Furthermore, processor 10a may be coupled to an optional L2 cache 228a similar to L2 cache 228.

Figure 14:
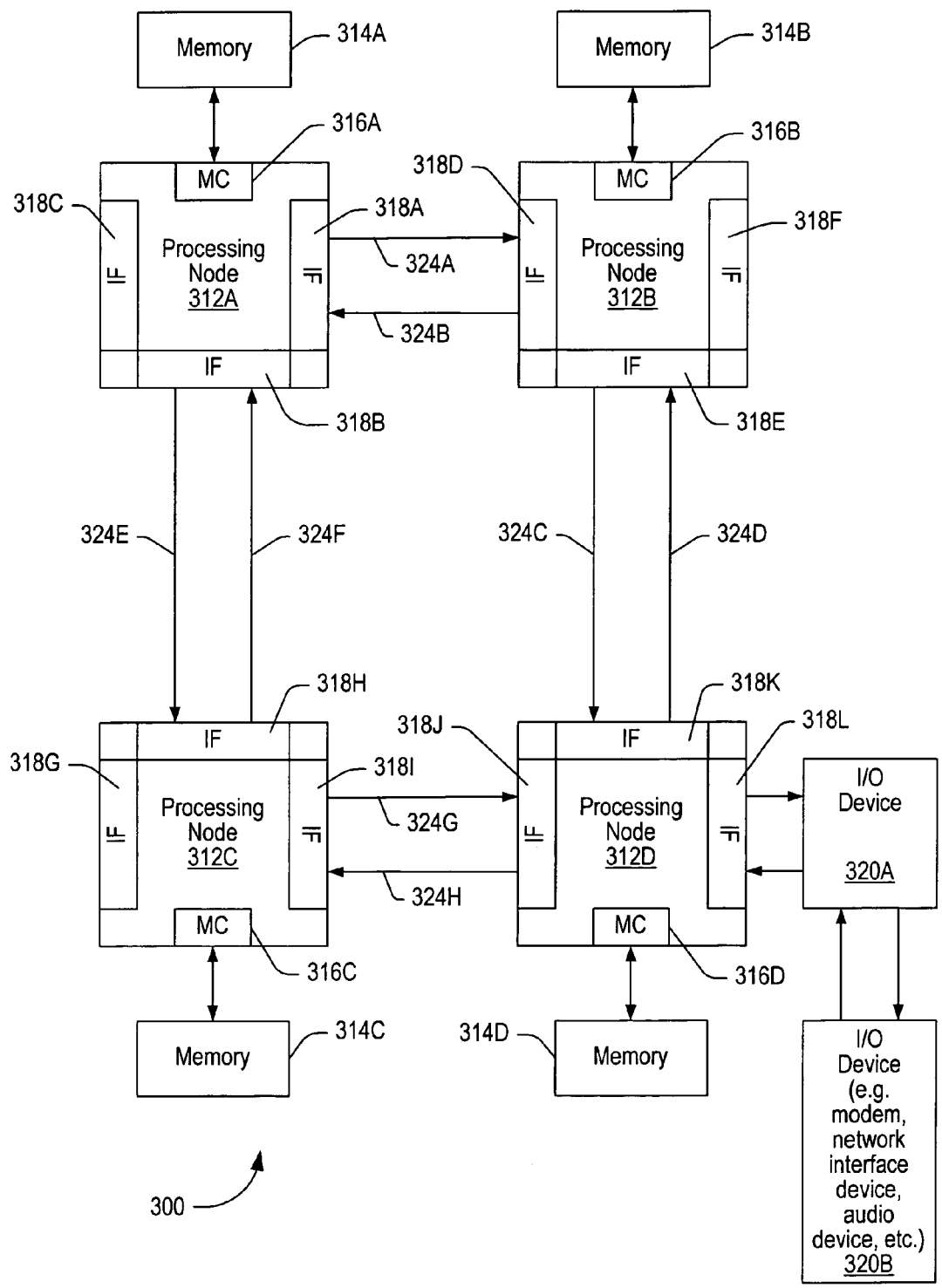
FIG. 14 is a block diagram of another embodiment of a computer system including the processor shown in FIG. 1.

Turning now to FIG. 14, another embodiment of a computer system 300 is shown. Other embodiments are possible and contemplated. In the embodiment of FIG. 14, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 14. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 14. Any suitable routing algorithm may be used. Other embodiments of computer system 300 may include more or fewer processing nodes then the embodiment shown in FIG. 14.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicate with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A processor comprising:
   a register file including a plurality of registers; and
   an execution core coupled to the register file, wherein the execution core is configured to: (i) use a value of a register address field of an instruction to select a least significant portion of one of the plurality of registers responsive to detecting a prefix field in the instruction, wherein each value encodable in the register address field results in a selection of the least significant portion of a respective one of the plurality of registers; and (ii) use the value of the register address field to select one of either a least significant portion or a second least significant portion of one of a subset of the plurality of registers responsive to detecting a lack of a prefix field in the instruction, wherein the subset excludes at least one of the plurality of registers, wherein a first value encodable in the register address field results in the selection of the least significant portion of a first register of the plurality of registers if the instruction includes the prefix field, and wherein the first value results in the selection of the second least significant portion of a second register of the plurality of registers if the instruction does not include the prefix field, and wherein the second register is different from the first register.

2. The processor as recited in claim 1 wherein the prefix field is a prefix byte.

3. The processor as recited in claim 1 wherein the instruction specifies a one byte operand size.

4. The processor as recited in claim 3 wherein the least significant portion and the second least significant portion are each a byte.

5. An apparatus comprising:
   one or more storage locations corresponding to a plurality of registers; and
   a processor coupled to the one or more storage locations, wherein the processor is operable to: (i) use a value of a register address field of an instruction to select a least significant portion of one of the plurality of registers responsive to detecting a prefix field in the instruction, wherein each value encodable in the register address field results in a selection of the least significant portion of a respective one of the plurality of registers; and (ii) use the value of the register address field to select one of either a least significant portion or a second least significant portion of one of a subset of the plurality of registers responsive to detecting a lack of a prefix field in the instruction, wherein the subset excludes at least one of the plurality of registers, wherein a first value encodable in the register address field results in the selection of the least significant portion of a first register of the plurality of registers if the instruction includes the prefix field, and wherein the first value results in the selection of the second least significant portion of a second register of the plurality of registers if the instruction does not include the prefix field, and wherein the second register is different from the first register.

6. The apparatus as recited in claim 5 wherein the prefix field is a prefix byte.

7. The apparatus as recited in claim 5 wherein the instruction specifies a one byte operand size.

8. The processor as recited in claim 7 wherein the least significant portion and the second least significant portion are each a byte.

9. A method comprising:
   responsive to detecting a prefix field in an instruction that also includes a register address field, selecting a least significant portion of one of a plurality of registers dependent on a value of the register address field, wherein each value encodable in the register address field maps to a different one of the plurality of registers; and
   responsive to detecting a lack of the prefix field in the instruction, selecting either a least significant portion or a second least significant portion of one of a subset of the plurality of registers dependent on the value of the register address field, wherein the subset excludes at least one of the plurality of registers, wherein a first value encodable in the register address field results in the selection of the least significant portion of a first register of the plurality of registers if the instruction includes the prefix field, and wherein the first value results in the selection of the second least significant portion of a second register of the plurality of registers if the instruction does not include the prefix field, and wherein the second register is different from the first register.

10. The method as recited in claim 9 wherein the prefix field is a prefix byte.

11. The method as recited in claim 9 wherein the instruction specifies a one byte operand size.

12. The method as recited in claim 11 wherein the least significant portion and the second least significant portion are each a byte.

13. A computer system comprising:
a processor comprising a register file including a plurality of registers, wherein the processor is configured to: (i) use a value of a register address field of an instruction to select a least significant portion of one of the plurality of registers responsive to detecting a prefix field in the instruction, wherein each value encodable in the register address field results in a selection of the least significant portion of a respective one of the plurality of registers; and (ii) use the value of the register address field to select one of either a least significant portion or a second least significant portion of one of a subset of the plurality of registers responsive to detecting a lack of a prefix field in the instruction, wherein the subset excludes at least one of the plurality of registers, wherein a first value encodable in the register address field results in the selection of the least significant portion of a first register of the plurality of registers if the instruction includes the prefix field, and wherein the first value results in the selection of the second least significant portion of a second register of the plurality of registers if the instruction does not include the prefix field, and wherein the second register is different from the first register; and
a peripheral device configured to communicate between the computer system and another computer system.

14. The computer system as recited in claim 13 wherein the prefix field is a prefix byte.

15. The computer system as recited in claim 13 wherein the instruction specifies a one byte operand size.

16. The computer system as recited in claim 13 wherein the least significant portion and the second least significant portion are each a byte.

17. The computer system as recited in claim 13 wherein the peripheral device comprises a modem.

18. The computer system as recited in claim 13 wherein the peripheral device comprises a network interface device.

19. The computer system as recited in claim 13 further comprising a second processor comprising a register file including a plurality of registers, wherein the second processor is configured to: (i) use a value of a register address field of an instruction to select a least significant portion of one of the plurality of registers responsive to detecting a prefix field in the instruction, wherein each value encodable in the register address field results in a selection of the least significant portion of a respective one of the plurality of registers; and (ii) use the value of the register address field to select one of either a least significant portion or a second least significant portion of one of a subset of the plurality of registers responsive to detecting a lack of a prefix field in the instruction, wherein the subset excludes at least one of the plurality of registers, wherein a first value encodable in the register address field results in the selection of the least significant portion of a first register of the plurality of registers if the instruction includes the prefix field, and wherein the first value results in the selection of the second least significant portion of a second register of the plurality of registers if the instruction does not include the prefix field, and wherein the second register is different from the first register.

20. The computer system as recited in claim 13 further comprising an audio device.

* * * * *